US009123059B2

(12) United States Patent  (10) Patent No.: US 9,123,059 B2
Clegg  (45) Date of Patent: Sep. 1, 2015

(54) MERCHANDISING PRODUCT WITH AUTO-DIAL CELLULAR COMMUNICATION

(71) Applicant: Americhip, Inc., Gardena, CA (US)

(72) Inventor: Timothy P. Clegg, Manhattan Beach, CA (US)

(73) Assignee: Americhip, Inc., Gardena, CA (US)

( * ) Notice: Subject to any disclaimer, the term of this patent is extended or adjusted under 35 U.S.C. 154(b) by 0 days.

(21) Appl. No.: 14/104,926

(22) Filed: Dec. 12, 2013

(65) Prior Publication Data

US 2014/0358687 A1  Dec. 4, 2014

Related U.S. Application Data

(60) Provisional application No. 61/829,371, filed on May 31, 2013.

(51) Int. Cl.
*H04B 1/38* (2006.01)
*G06Q 30/02* (2012.01)
*H04M 1/00* (2006.01)
*G06Q 30/00* (2012.01)

(52) U.S. Cl.
CPC ............................... *G06Q 30/0267* (2013.01)

(58) Field of Classification Search
USPC ................. 434/317; 455/90.3, 403, 460, 564, 455/575.3, 575.4
See application file for complete search history.

(56) References Cited

U.S. PATENT DOCUMENTS

| 7,058,365 | B2 | 6/2006 | Kugler |
| 7,392,064 | B2 | 6/2008 | Geshiro |
| 7,953,449 | B2 | 5/2011 | Griffith |
| 8,312,651 | B2 | 11/2012 | Mandelbaum |
| 8,341,858 | B2 | 1/2013 | Clegg |
| 8,532,610 | B2 | 9/2013 | Manning Cassett |
| 2003/0003954 | A1* | 1/2003 | Kugler .......................... 455/556 |
| 2004/0203669 | A1* | 10/2004 | Geshiro ..................... 455/414.1 |
| 2006/0171524 | A1 | 8/2006 | Tsuchiya |
| 2009/0164209 | A1* | 6/2009 | Erickson et al. ............. 704/201 |
| 2010/0135473 | A1* | 6/2010 | Dewing et al. ............. 379/88.13 |
| 2010/0223824 | A1* | 9/2010 | Mandelbaum et al. ......... 40/463 |

* cited by examiner

*Primary Examiner* — Ayodeji Ayotunde
(74) *Attorney, Agent, or Firm* — Francis D Logan

(57) ABSTRACT

A method and a device for making a wireless cellular communication using a merchandising product with a marketing message. A merchant delivers a merchandising product to a user. The merchandising device contains an electronic module that comprises memory that stores multimedia and an identifier such as telephone number. The electronic module contains the components necessary to play the multimedia, including one or more audio output devices and optionally a video screen. The electronic module also contains the components necessary to connect to a wireless network and to place a cellular communication using the wireless network to the identifier. The electronic module is activated by a switch. Upon activation, the electronic module plays the multimedia on the one or more audio output devices and, optionally, the video screen. While the multimedia is playing, the module connects to a wireless network. Upon the conclusion of playing the multimedia, the module makes a wireless communication with the stored identifier number with no further action on the part of the user.

20 Claims, 16 Drawing Sheets

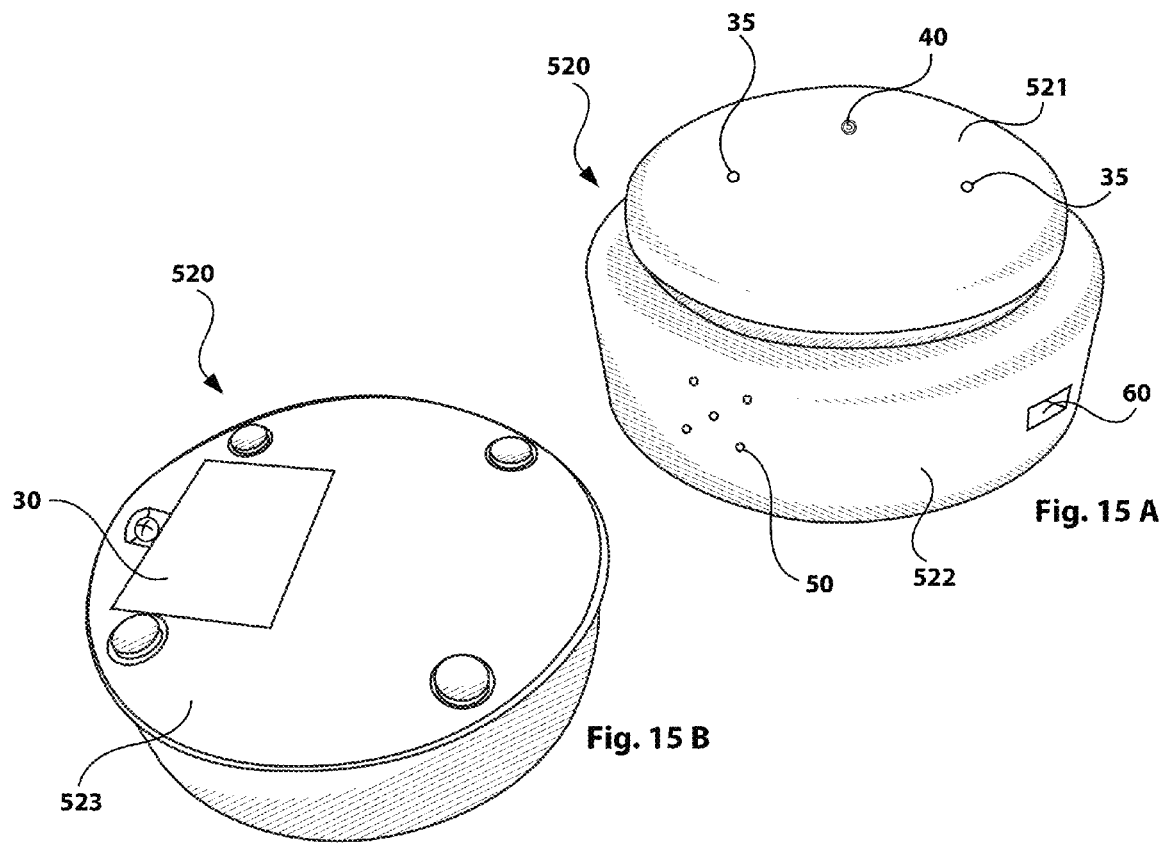
Fig. 15 A
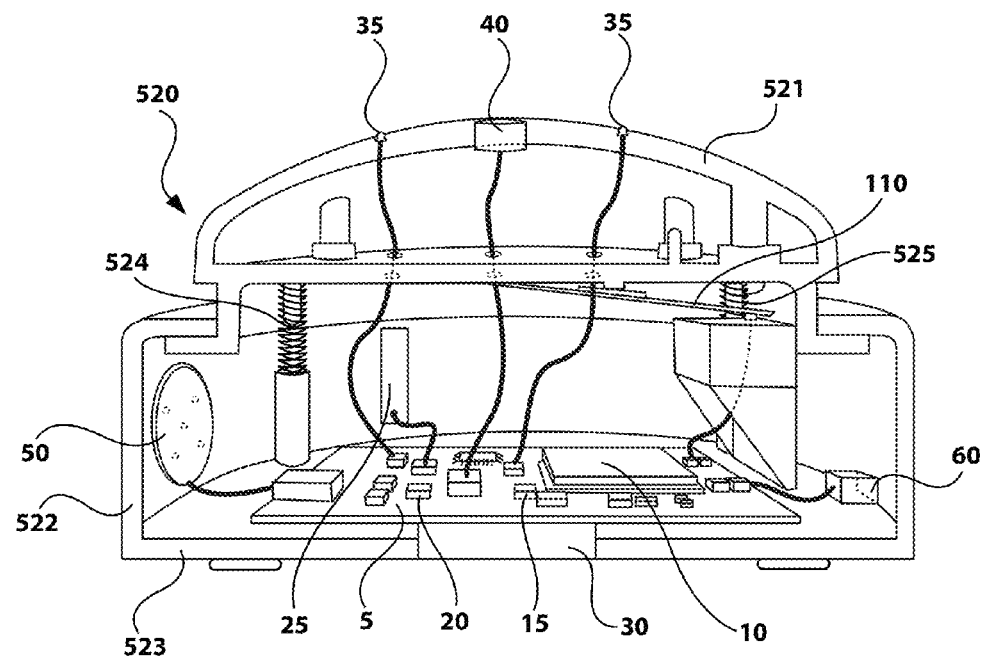
Fig. 15 B
Fig. 15 C

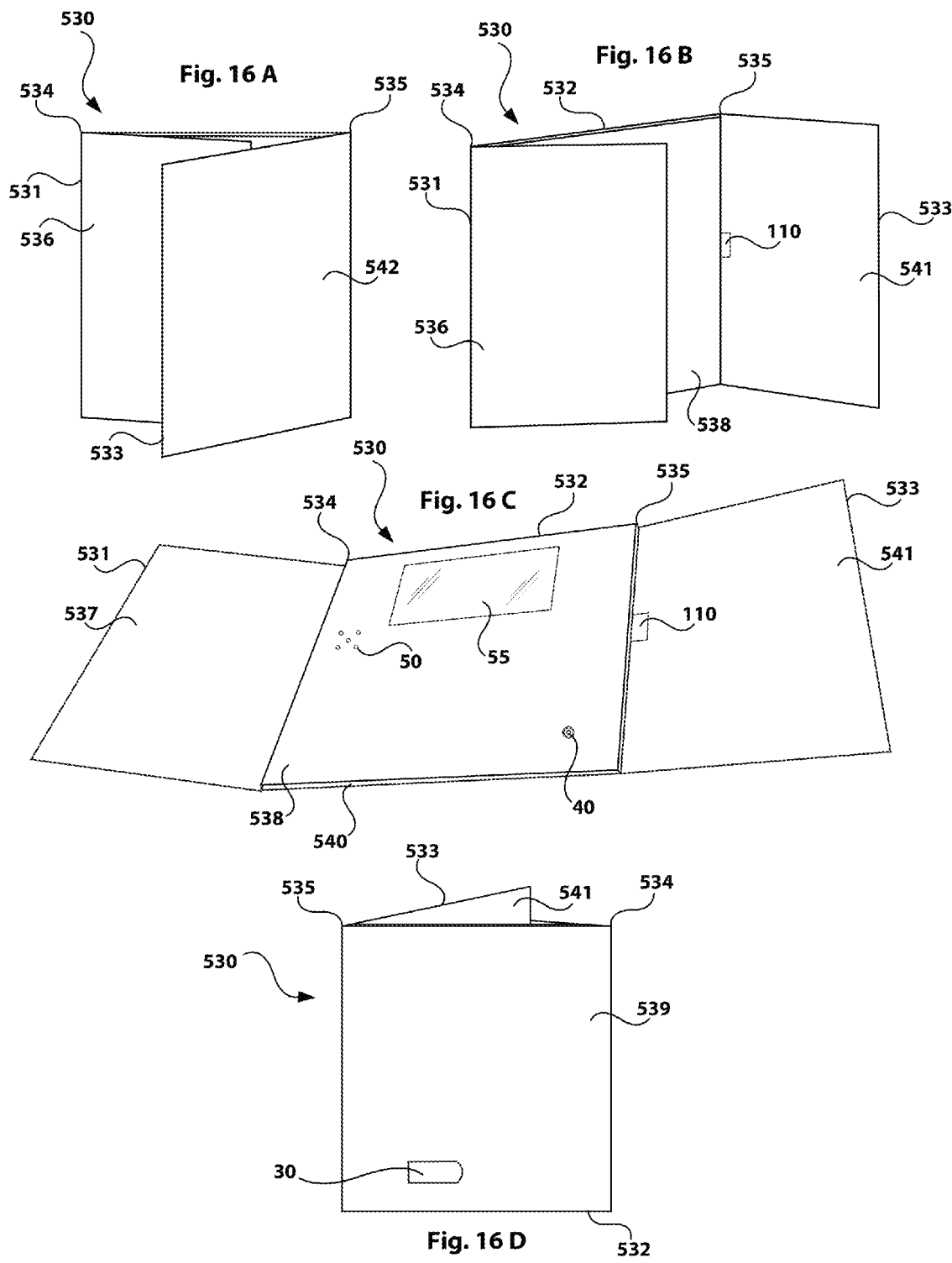

MERCHANDISING PRODUCT WITH AUTO-DIAL CELLULAR COMMUNICATION

CROSS REFERENCE TO RELATED APPLICATION

This application claims the benefit of U.S. Provisional Application No. 61/829,731, filed May 31, 2013, and titled "Merchandising Product with Wireless Connectivity," which is incorporated by reference in its entirety.

FIELD OF INVENTION

The present invention relates to merchandising products and, in particular, to merchandising products that include an electronic module that, when activated, establishes a wireless network connection while delivering a marketing message stored in local memory to the user then makes a cellular communication with a digital identification number, such as a telephone number, stored in memory with no additional action on the part of the user, and to methods for delivering and implementing cellular communications in merchandising products with auto-dial functionality.

BACKGROUND OF THE INVENTION

Affordable and reliable wireless communications modules are revolutionizing communications. These modules are the backbone of mobile telephone and mobile computing industries.

Except for the field of digital signage, the advertising industry has not incorporated wireless communications into its products. As cellular telephone technology has become widely available and widely used, marketers can take advantage of people's familiarity with cell phone technology to develop new ways of reaching their clients.

Thus, what is needed is a merchandising product that includes an auto-dial wireless cellular module, allowing the sender of the merchandising product or a third party to have a live interactive exchange with the user of the product upon the user's activation of the module, to receive texts/data/e-mail from the user of the module and to collect analytical information regarding the use of the product.

SUMMARY

The present invention is a merchandising product with an embedded or attached electronic module that has the capability of establishing a wireless cellular connection and making a cellular communication with a digital identification number pre-stored in the module's memory upon activation of the module without any further action on the part of the user (the "auto-dial cellular device"). One preferred embodiment of the cellular communication is a telephone call. Other embodiments include the sending of a text message, data or e-mail. The digital identification number to be contacted is, in a preferred embodiment, a telephone number. In other embodiments, the digital identification number may be any alphanumeric/symbolic string of characters that is used in the context of cellular communications to identify an intended recipient of a communication. The module further has the capability of tracking data regarding the usage thereof as a communication device. "Merchandising products" include flat, foldable and three-dimensional display cards, greeting cards, card holders, mailers, invitations, desktop calendars, desktop displays, magazine inserts, brochures, corporate communications and training materials, handouts, photo books, pop-up books, novelty items, in-store displays and similar products comprising a structure with a marketing message and in which the wireless cellular module can be embedded.

A "marketing message" includes any form of marketing, advertising copy and artwork, including but not limited to text, graphics, sound, design, trademarks and trade dress.

The electronic module comprises memory that may store audio only content, visual only content, such as still images, graphics, photographs, text, and/or video, and/or combined audio and visual content (audio only, visual only, and combined audio and visual content is referred to collectively as "multimedia"). The multimedia may include any content capable of being seen and/or heard. The micro-controller may play the multimedia stored in the memory ("local multimedia") before, during and/or after the micro-controller attempts to establish a wireless cellular connection. The memory may contain no, one or a plurality of local multimedia. (Each individual segment of multimedia is referred to herein as a "chapter".) The chapters of multimedia may be played in sequential order or in random order.

The local multimedia can be selected or created by the sender of the merchandizing product, or created and provided by a third party content vendor. The local multimedia may be loaded into the memory by any suitable data connection or transfer device, including wired or wireless internet or network connection, or portable data storage device such as USB, flash drive, compact flash, or smart card wherein the data is transferred via an industry-standard card interface or other data transfer protocol.

The marketing message contained on the auto-dial cellular device along with the local multimedia and the cellular communication placed by the electronic module may provide a combined media message to the user.

Embodiments of the embedded wireless cellular module include audio-only cellular telephone service, cellular telephone service with one-way and two-way video, text messaging, e-mail, and data exchanges. The wireless connection can also be used to transmit and receive data about the usage of the marketing product and other analytics.

The auto-dial cellular device includes an electronic module activated by a switch. The electronic module comprises a micro-controller, digital memory, a modem, an antenna, a microphone, an audio output device (i.e., a speaker and/or earphone jack) and a power source and in a particular embodiment may further comprise a power/data port. The digital memory may contain at least one chapter of local multimedia. The digital memory also contains a digital identification number, such as a telephone number. (While the preferred embodiment comprises a telephone number, this disclosure specifically encompasses future digital identification numbers used in cellular communications.) Upon activation by the switch and, depending on the configuration of the product, the playing of the local multimedia, the electronic module places a cellular communication to a number stored in the memory without further action on the part of the end user. The cellular communication includes a cellular telephone call, a text message, an email and other data. In embodiments other than the cellular telephone call, the memory further comprises the content to be sent from the auto-dial cellular device to the digital identification number. In these embodiments, upon placing a cellular communication to the identification number, the micro-controller sends the stored content to that number.

The auto-dial cellular device may further comprise one or more video screens, and may further comprise a camera. In this set of particular embodiments, the electronic module may receive digital video as part of the cellular communication and display the video on the one or more screens. The auto-dial cellular device further may obtain digital video from the camera included therein and may send that video as part of the cellular communication and may display that video on the one or more screens. In a particular embodiment, at least one of the one or more screens is a touch screen. In this particular embodiment, the touch screen may be used during the cellular communication to enhance communications options with the counterparty to the call.

For each of the auto-dial cellular device embodiments, the electronic module may further comprise one, two or more than two LEDs. The module may illuminate a single LED in order to indicate that the module has successfully detected and connected with a wireless network. The module may illuminate one of two LEDs to indicate that the module is on but no connection to a wireless network is available, and may illuminate the second of two LEDs to indicate that the module is on and a connection to a wireless network has been made. The module may illuminate one or more of the plurality of LEDs to indicate the strength of the wireless network signal.

For each of the auto-dial cellular device embodiments, the electronic module may further comprise a location determining module, such as a global positioning satellite (GPS) module. The electronic module may determine the location of the device at any time that the module is activated and may communicate that information to a third party as part of a cellular communication or as part of sending analytics.

For each of the foregoing representative embodiments, the structure of auto-dial cellular device may be any container in which the electronic module may be embedded or attached. Containers may be of any size and shape suitable for the intended use of the product. Exemplars of such containers include flat cards, foldable cards, booklets, books, cubes of varying height, width and depth, cubes with lids, boxes (i.e., a cube with access to the interior) with attached and detachable lids, multi-page books, various asymmetrical shapes and combinations of the foregoing. In some embodiments, the switch will require direct manual operation to activate and deactivate the module.

The auto-dial cellular device container may be, entirely or in part, in the form of two or more interconnected panels or other components of paper, plastic or any other suitable material that are foldable, slideable, and/or rotatable (collectively, "moveable") with respect to each other. In embodiments including moveable panels, the container will have a closed configuration in which the module is off and an open configuration in which the module is activated. The switch may be triggered on and off by the act of moving one panel with respect to another. The switch in these embodiments may be any device suitable for using the motion of a panel for triggering the electronic module (e.g., a slide tongue or a magnet).

In certain embodiments, the switch may open and close by detecting changes in the environment, such as light sensor, motion sensor, pressure button, radio frequency sensor, and audio sensor switches.

For each of the foregoing representative embodiments, in a particular embodiment the micro-controller may gather user analytics data, including but not limited to identification code of the auto-dial cellular device, date, time and location of use of the product, frequency of use, length of use, and characteristics of any failed communications. In a particular embodiment, the electronic module may send a batch of user analytics data to a third party on a particular schedule. In a particular embodiment, the electronic module may send user analytics data to a third party concurrently with any use of the auto-dial cellular device that generates user analytics data.

BRIEF DESCRIPTION OF THE DRAWINGS

The present invention may be more readily understood by referring to the accompanying drawings, in which like numerals refer to like parts, and in which:

FIGS. 15A, 15B and 15C illustrate external views of a particular configuration; and FIGS. 16A, 16B, 16C and 16D illustrate external views of a particular configuration.

DETAILED DESCRIPTION OF PREFERRED EMBODIMENTS

Figure 1:
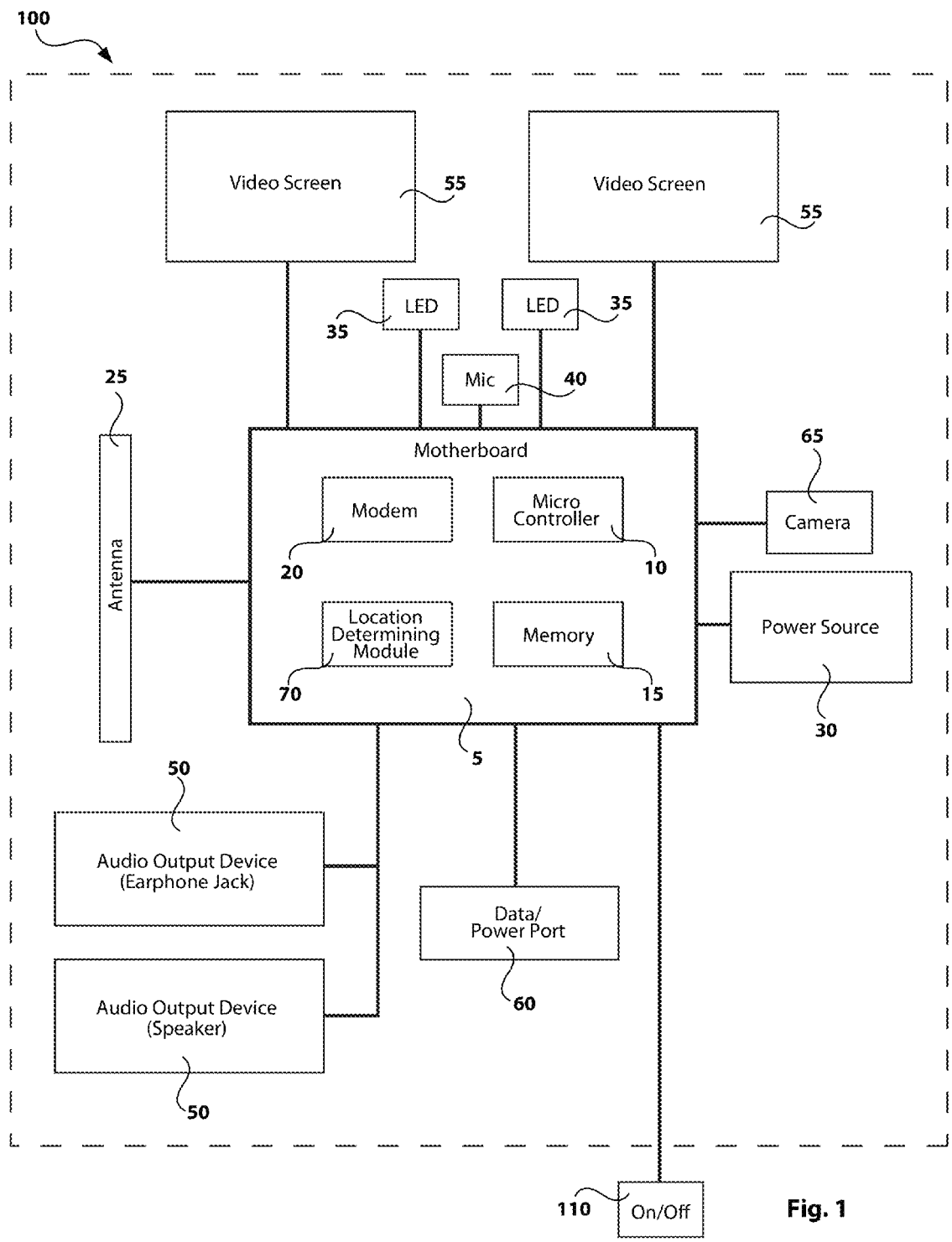
FIG. 1 is a schematic of an embodiment of an electronic module in an embodiment of the present invention.

Referring to FIG. 1, a schematic of the electronic module 100 of a preferred embodiment of the present invention is shown. In this embodiment, the electronic module 100 comprises a micro-controller 10 as the central processing unit (or "CPU"), a digital memory 15, a modem 20, an antenna 25, a power source 30, one or more LEDs 35, a microphone 40, one or more audio output devices 50, one or more video screens 55, a combined data/power port 60, a camera 65, and a location determining module 70. The micro-controller 10, the memory 15, the modem 20 and the location determining module are all mounted on the board 5. The electronic module 100 is activated by a switch 110 (i.e., once the switch is triggered, electrical current flows through the module allowing the various components to function as intended in accordance with their design). The components are operatively connected as to create a functioning device. Not all embodiments of the invention will include all these components. In an alternative embodiment (not shown) a dedicated power port 61 and dedicated data port 62 are provided in lieu of the combined data/power port 60.

The micro-controller 10 is any of the commercially available micro-controllers, such as an ARM core processor, programmed with software and/or firmware required to give the module the desired functionality. The micro-controller is activated by a switch 110 mounted on or in the marketing product. As used herein, switch includes a slide switch, toggle switch, rocker switch, pushbutton switch, slide tongue, pressure button, push button, solar cell, magnets, light sensors, motion sensors, vibration trigger, tilt trigger, or the like; however, any device known in the art that can cause a circuit to close and let power flow through can be used. In certain embodiments, in which the auto-dial cellular device includes two or more moveable panels, the switch may be attached to the panels of the product in such a manner that the movement of one panel with respect to another beyond a certain position will activate the switch. In other embodiments the switch may require manual operation by the user of the product.

The memory 15 is one or more digital data storage devices, including but not limited to memory cards, compact flash memory cards, secure digital and secure digital high capacity cards.

The modem 20 is any device that provides for digital communication over a wireless network including but not limited to WiFi, GSM and CDMA technology. The antenna 25 is any antenna that receives and transmits the radio waves needed for the modem to establish a connection with a wireless network.

The module is powered by a power source 30. In a preferred embodiment, the power source is comprised of batteries of sufficient size to power the module and software. However, any miniature mountable power source of sufficient power may be used such as, but not limited to, solar cells, direct drives, mechanically driven drives and the like. The preferred batteries used to power the device are of sufficient capacity as to allow the device to be operated repeatedly for several months. In a preferred embodiment, the batteries are laid flat and mounted on the same module board containing the micro-controller. In a preferred embodiment, the batteries are rechargeable. In this embodiment, the batteries are recharged by connecting the device to an external power source via an AC or DC connector port 61 or via a combined data/power port 60 such as a USB port. Alternatively, the power source may be external to the product and the product is powered by connecting the product to the external power source via a power connector port 61 or a combined data/power port 60.

The one or more light emitting diodes (LEDs) 35 are any commercially available LED suitable for embedding in an auto-dial cellular device that provide visible light in ordinary ambient light conditions at a range of three to six feet.

The microphone 40 is a commercially available microphone suitable for embedding in an auto-dial cellular device. The micro-controller 10 is configured with the drivers needed to operate the microphone 40. In a preferred embodiment, the microphone 40 and its drivers are configured to capture human voices which are clearly audible within a range of three to six feet.

In a preferred embodiment, the one or more audio output devices 50 are one or more commercially available audio speakers and associated audio amplifiers suitable for embedding in an auto-dial cellular device. In a preferred embodiment, the speakers and their associated audio amplifiers 50 are configured to generate sound levels which are clearly audible within a distance of three to six feet from the speakers. The micro-controller is configured with the drivers needed to operate the speakers. The speakers and drivers 50 may be configured to play audio stored in any standard audio file format. In another preferred embodiment the audio output device 50 is an earphone jack. In this embodiment, the earphone jack 50 may be either in addition to or in lieu of the one or more speakers and associated audio amplifiers, and the micro-controller is configured with the drivers needed to create audible sound in earphones when the earphones are plugged into the earphone jack 50.

The one or more video screens 55 are any type of image display device capable of display of static and video images. One example of a suitable device is a liquid crystal display. Other types of displays that may be used in accordance with this disclosure include STN LCD, TFT LCD, CSTN, OLED/PLED, FED or SED. Video display formats may include MPEG4, MJPEG, or any other suitable format. In embodiments comprising a touchscreen video screen, industry-standard touchscreens may be used.

The combined data/power port 60 is any industry standard connector allowing for data to be transmitted between the module and an external device while charging the internal batteries 30, such a USB port. The power charging port 61 may be a separate connector dedicated solely to providing power to the power source 30. The dedicated data port 62 is any connector allowing for data to be transmitted between the module and an external device.

The camera 65 is any commercially available digital camera suitable for embedding in an auto-dial cellular device.

The location determining module 70 is any industry-standard component for determining the location of the device, such as a global positioning satellite detection (GPS) module.

In a preferred embodiment, the user receives the auto-dial cellular device from a third party or its agent who wishes to receive a cellular communication from the recipient. The user takes the action necessary to trigger the switch 110 (which action may be opening the auto-dial cellular device). The triggering of the switch 110 causes the power source 30 to provide power to the whole electronic module 100. The electronic module is configured to play the local multimedia on the audio output device 50, and video screen 55 if provided, without further action on the part of the user, immediately upon receiving power from the power source 30. While the module 100 is playing the multimedia, it concurrently searches for a wireless network and goes through the handshaking process necessary to connect to the network. Once the module 100 has finished playing the multimedia and completed the handshake with the wireless network, the module 100 makes a cellular communication to the digital identification number stored in the memory 15, again without further action on the part of the user. During the cellular communication, the micro-controller 10 controls the transmission and reception of call, voice, video and data signals. In embodiments in which the cellular communication includes a cellular telephone call, during transmission mode, the microphone 40 captures the user's voice, converts the voice to voice signals and relays those signals to the micro-controller 10. The micro-controller 10 sends the voice signals to the modem 20 which transmits the voice signals through the antenna 25 to a remote station. During receiving mode, the modem 20 receives voice signals through the antenna 25 from a remote station and passes those signals to the micro-controller 10. The micro-controller 10 then passes the received voice signal to the audio output device 50, which generates an audible signal for the user's hearing. In embodiments including a camera, the camera 65 passes a video signal to the micro-controller 10. The micro-controller 10 sends the video signal along with the voice signal to the modem 20 which transmits the voice and video signal through the antenna 25 to a remote station. In certain embodiments with one or more video screens, the modem 20 receives video signals along with the voice signals through the antenna 25 from a remote station and passes the combined voice and video signal to the micro-controller 10. The micro-controller 10 then passes the received video signal to one or more video screens 55, which generates a visual image on the screen. The micro-controller 10 may also show the video signal received from the camera 65 on one of the screens 55. In a preferred embodiment, one of the screens may be a touchscreen. In this embodiment, the electronic module is programmed to recognize touches on the touchscreen, and send the data generated by a touch on the touchscreen to the counterparty to the call.

Figure 2:
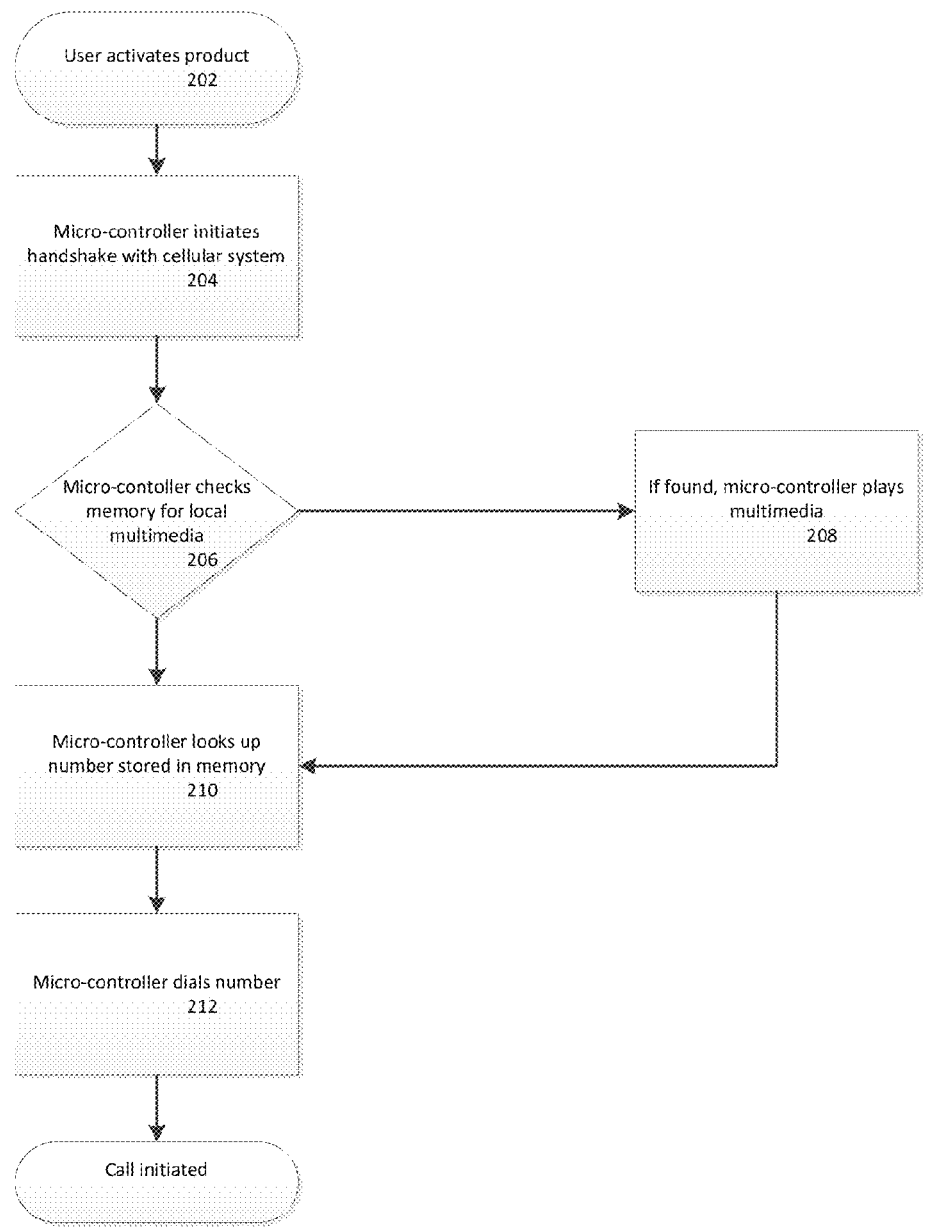
FIG. 2 illustrates a flow diagram of the steps involved in making a call in the cellular phone embodiment of auto-dial cellular device.
Figure 3:
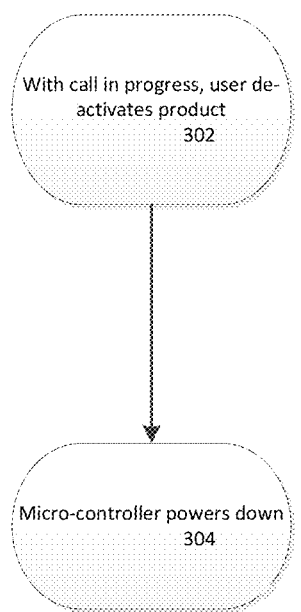
FIG. 3 illustrates a flow diagram of the steps involved in terminating a call in the cellular phone embodiment of the auto-dial cellular device.
Figure 4:
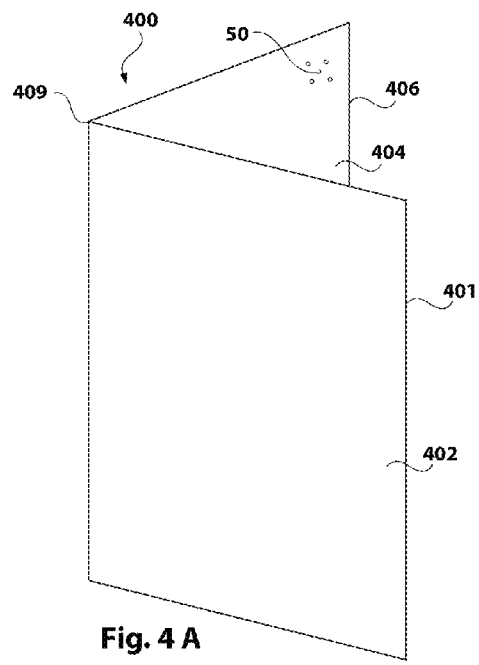
FIGS. 4A, 4B and 4C illustrate external views of a particular configuration.
Figure 4:
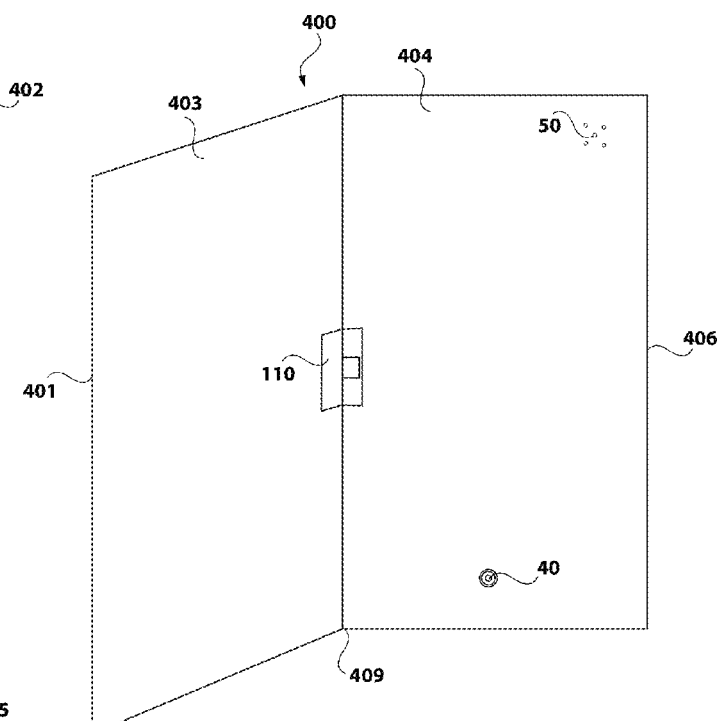
Figure 4:
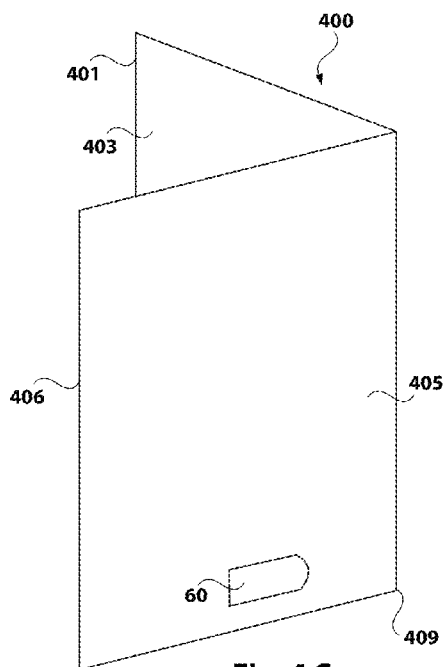
Figure 5:
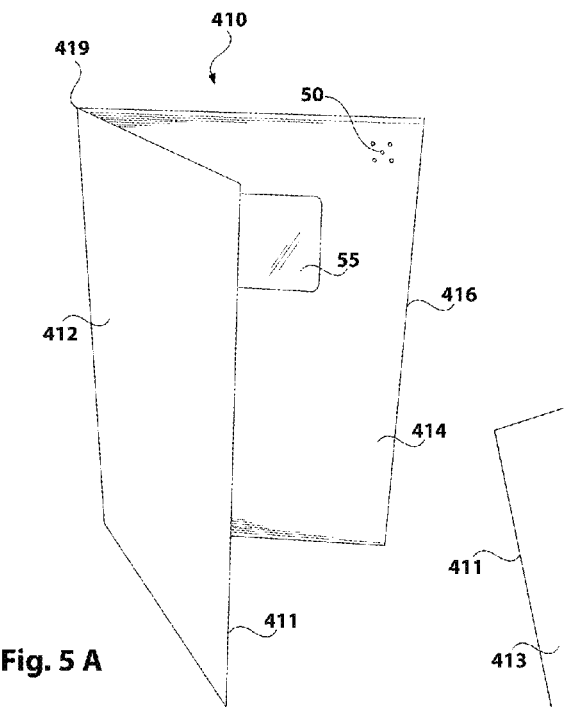
FIGS. 5A, 5B and 5C illustrate external views of a particular configuration.
Figure 5:
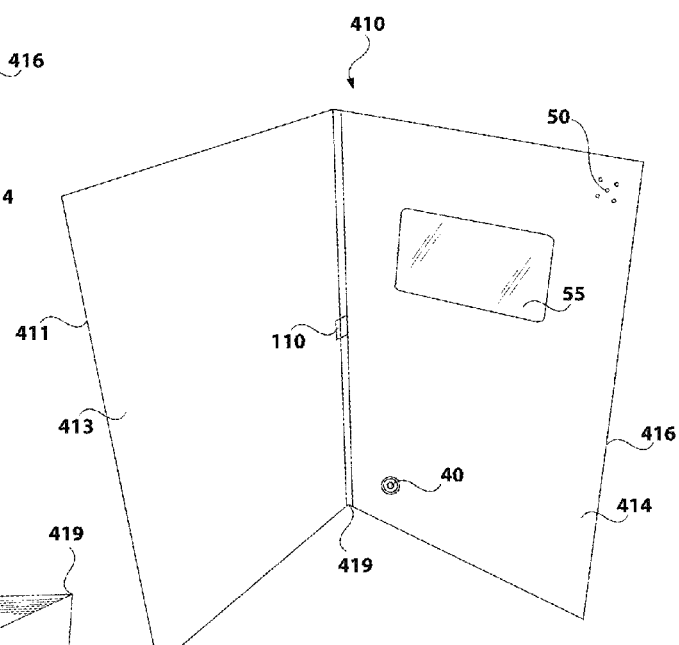
Figure 5:
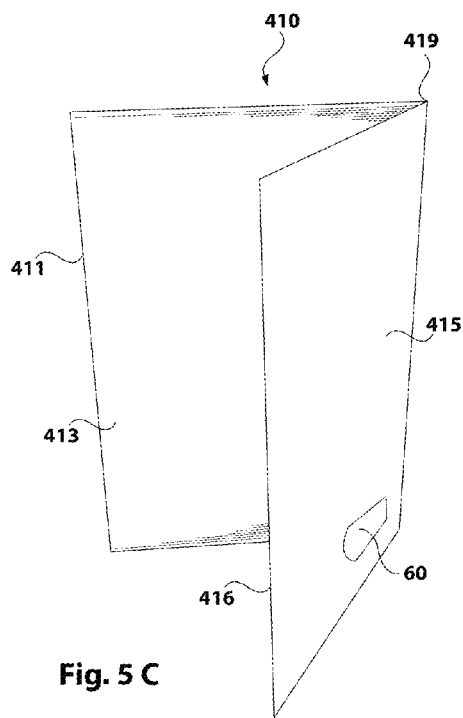

The cellular phone particular embodiment of the present invention enables a user to initiate a cellular telephone call by activating the module and terminate a cellular telephone call by deactivating the module. FIGS. 2 & 3 illustrate flow diagrams of the steps involved in performing these basic phone functions in accordance with the present invention.

FIG. 2 illustrates a flow diagram 200 of the steps involved in making a call through the cellular phone embodiment of the auto-dial cellular device. To make the call, in step 202 the user provides power to the micro-controller 10 from the power source 30 by closing the switch 110. Upon receiving power, in step 204 micro-controller 10 sends a signal to the modem 20 to search for a wireless cellular phone network and, once the modem 20 indicates that a suitable network has been found, initiates a handshaking protocol with the network. Also upon receiving power, in step 206 the micro-controller 10 accesses the memory 15 to search for local multimedia stored in the memory 15. If local multimedia is found, in step 208 the micro-controller 10 plays the local multimedia on the audio output device 50, and on the video screen 55 if provided. Upon completing the handshake with the wireless network and upon finishing playing the local multimedia, if any, in step 310 the micro-controller 10 looks up the digital identification number in the memory, and in step 312 places a cellular telephone call to that number.

FIG. 3 shows a flow diagram 300 of the steps involved in terminating a call on the cellular phone embodiment of the present invention. In step 302, the user opens the switch 110. Opening the switch disconnects power from both the micro-controller 10 and the modem 20. In step 304, the micro-controller powers down, terminating the call.

In other preferred embodiments, the cellular communication is a text message, an email, a packet of data or a combination thereof, but not a telephone call. In these embodiments, the memory 15 further comprises the text message, email and/or data packet. Once the module 100 finishes playing the multimedia and completes the handshake with the wireless network, in these embodiments the module 100 sends the text message, email, data packet or combination thereof stored in the memory 15 to the digital identification number also stored in the memory 15. If the micro-controller 10 is programmed to send analytics (as discussed below) then the module 100 will also send the analytics to that digital identification number. Upon completing these tasks, the micro-controller will disconnect from the wireless network and power down.

In a preferred embodiment the power source 30 of the auto-dial cellular device is a rechargeable battery that is recharged by connecting the appropriate power cable, such as a USB cable, to the combined data/power port 60.

In a preferred embodiment, the electronic module 100 comprises one or more LEDs 35. In the single LED configuration, the LED 35 may illuminate if the electronic module 100 is able to successfully complete the handshake with a wireless network. In a two-LED configuration, one LED 35 may illuminate if the module is on but unable to connect to any wireless network, and the other LED 35 may illuminate the module is on and has successfully connected to a wireless network. In the multiple LED configuration, a certain number of LEDs 35 may illuminate based on the signal strength of the wireless network.

In a preferred embodiment, the electronic module 100 comprises a location determining module 70, such as a global positioning satellite (GPS) module. The electronic module 100 may determine the location of the auto-dial cellular device at any time that the module is activated and may communicate that information to a third party as part of a cellular communication or as part of sending analytics.

In all embodiments, the micro-controller 10 may include programming that collects data regarding the use of the auto-dial cellular device for cellular communications (generically, "analytics"). Data comprising analytics may include the micro-controller's own identification code, date, time, frequency of use, length of use, and characteristics of any failed interactions. Analytics may further comprise the precise location of the device during each use if the electronic module 100 comprises a location determining module 70.

The micro-controller 10 may include programming that stores analytics in the memory 15, and/or that sends analytics data immediately upon collection to a server. In a particular embodiment, the electronic module 100 may send a batch of user analytics data to a third party on a particular schedule. In a particular embodiment, the electronic module 100 may send user analytics data to a third party concurrently with any use of the auto-dial cellular device that generates user analytics data.

FIGS. 4 through 16 disclose shapes of the container in which the electronic module is embedded for various preferred embodiments.

FIGS. 4A, 4B and 4C illustrate three perspectives of an embodiment of a moveable card construction of the present invention, in which card 400 has a first panel 401 and a second panel 406 joined along a fold line or hinge 409. The first panel 401 has an outside face 402 and an inside face 403. The second panel 406 has an inside face 404 and an outside face 405. The electronic module 100 is embedded inside the second panel 406. Die cuts in the inside face 404 of the second panel 406 are shown for the microphone 40 and the audio output device 50, which in this embodiment is a speaker. A die cut in the outside face 405 of the second panel 406 is shown for access to the combined power/data port 60. The switch 110, which in this embodiment is a slide switch, is placed across the hinge 409. The electronic module 100 is activated by the switch 110. In this embodiment, the slide tongue switch 110 activates the electronic module 100 upon the opening of the card, and deactivates the electronic module 100 by the closing of the card. A marketing message may be placed on any of the four panels 402, 403, 404 and 405.

FIGS. 5A, 5B and 5C illustrate three perspectives of an embodiment of a moveable card construction of the present invention, in which card 410 has a first panel 411 and a second panel 416 joined along a fold line or hinge 419. The first panel 411 has an outside face 412 and an inside face 413. The second panel 416 has an inside face 414 and an outside face 415. The electronic module 100 is embedded inside the second panel 416. Die cuts in the inside face 414 of the second panel 416 are shown for the microphone 40, the audio output device 50, which in this embodiment is a speaker and a video screen 55, which is visible through the die cut. A die cut in the outside face 415 of the second panel 416 is shown for access to the combined power/data port 60. The switch 110, which in this embodiment is a slide switch, is placed across the hinge 419. The electronic module 100 is activated by the switch 110. In this embodiment, the slide tongue switch 110 activates the electronic module 110 upon the opening of the card, and deactivates the electronic module 110 by the closing of the card. A marketing message may be placed on any of the four panels 412, 413, 414 and 415.

Figure 6:
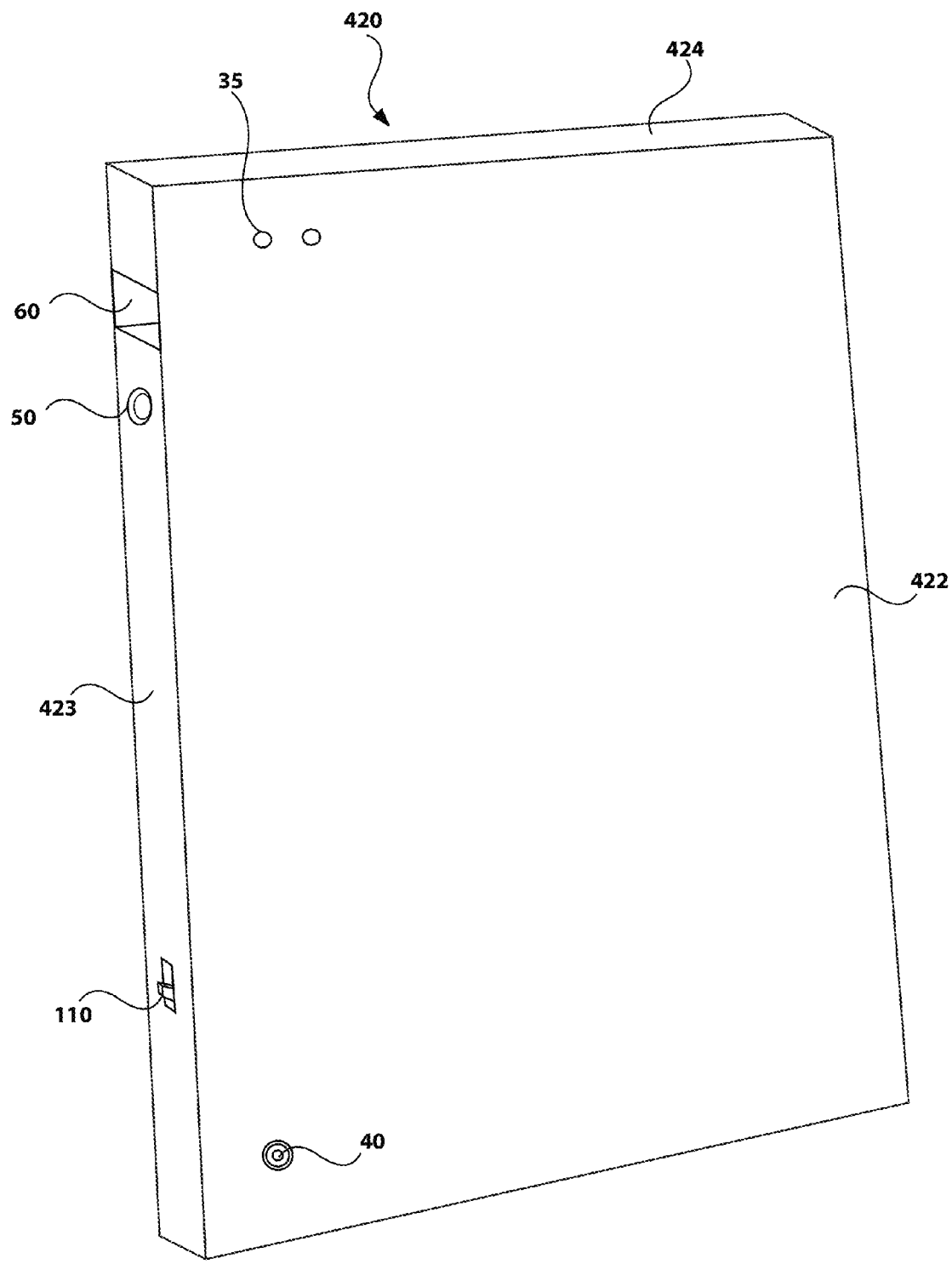
FIG. 6 illustrates an external view of a particular configuration.

FIG. 6 illustrates an embodiment of a flat card construction of the present invention, in which the card 420 has a front 422, a back (not shown) and an edge between the two, shown in FIG. 6 as a top edge 424 and a side edge 423. The front 422 has die cuts for the microphone 40 and two LEDs 35. The switch 110 is located in the side edge 423 and in this embodiment is a manually-operated toggle switch. A die cut for the audio output device 50 which in this embodiment is an earphone jack is also located in the side edge 423. A die cut for the combined data/power port 60 is also located in the side edge 423. In alternative embodiments, the die cuts in the side edge 423 may be located on the top edge 424, the opposite side edge (not shown) and/or bottom edge (not shown). A marketing message may be placed on any of the front panels 422 and back panel.

Figure 7:
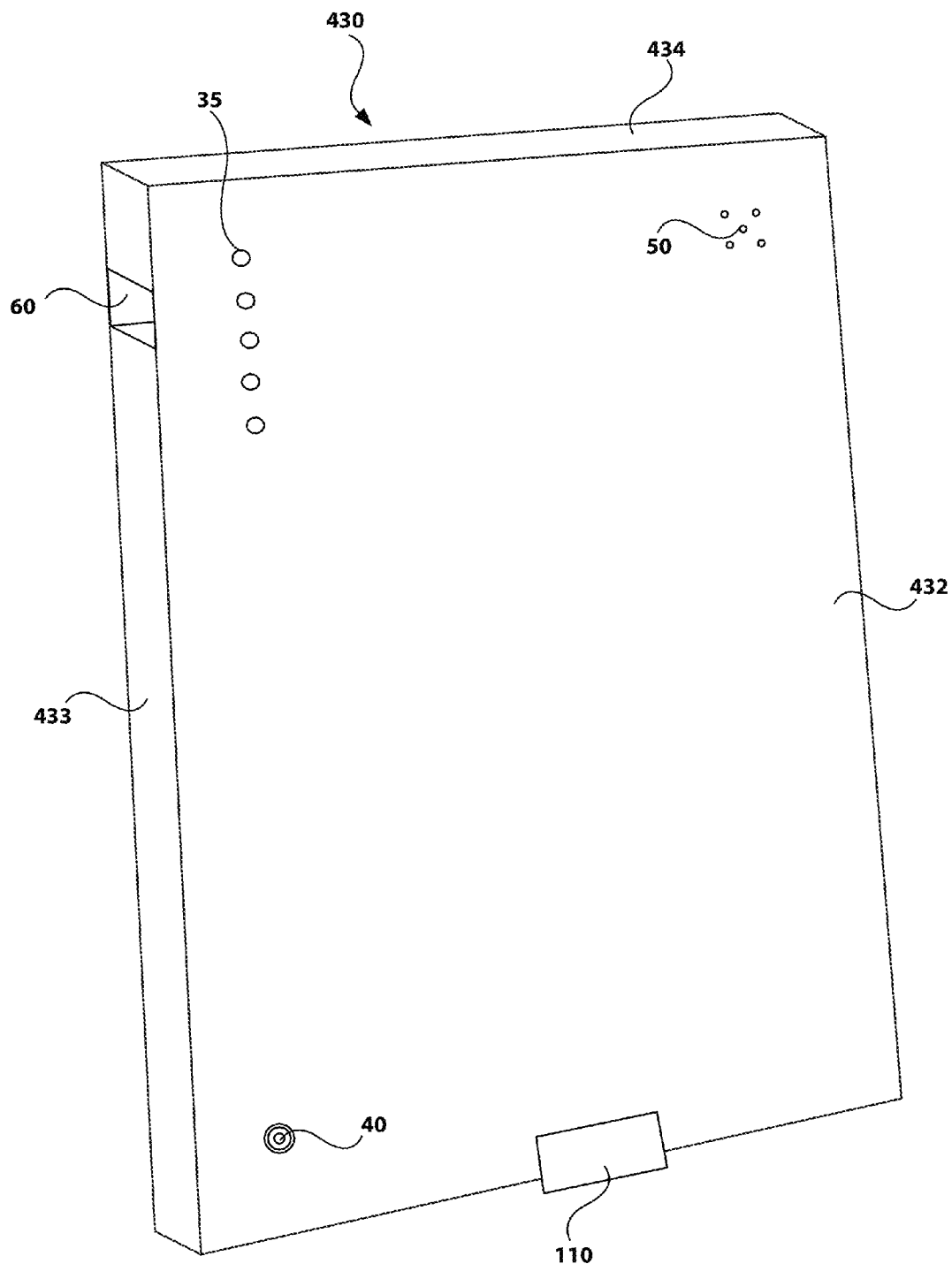
FIG. 7 illustrates an external view of a particular configuration.

FIG. 7 illustrates an embodiment of a flat card construction of the present invention, in which the card 430 has a front 432, a back (not shown) and an edge between the two, shown in FIG. 7 as a top edge 434 and a side edge 433. The front 432 has die cuts for the microphone 40, five LEDs 35, and an audio output device 50 which in this embodiment is a speaker. The switch 110 is centered close to the bottom of the front 432 and in this embodiment is a pull-tab switch. A die cut for the combined data/power port 60 is located in the side edge 433. In alternative embodiments, the die cut in the side edge 433 may be located on the top edge 434, the opposite side edge (not shown) and/or bottom edge (not shown). A marketing message may be placed on any of the front panels 432 and back panel.

Figure 8:
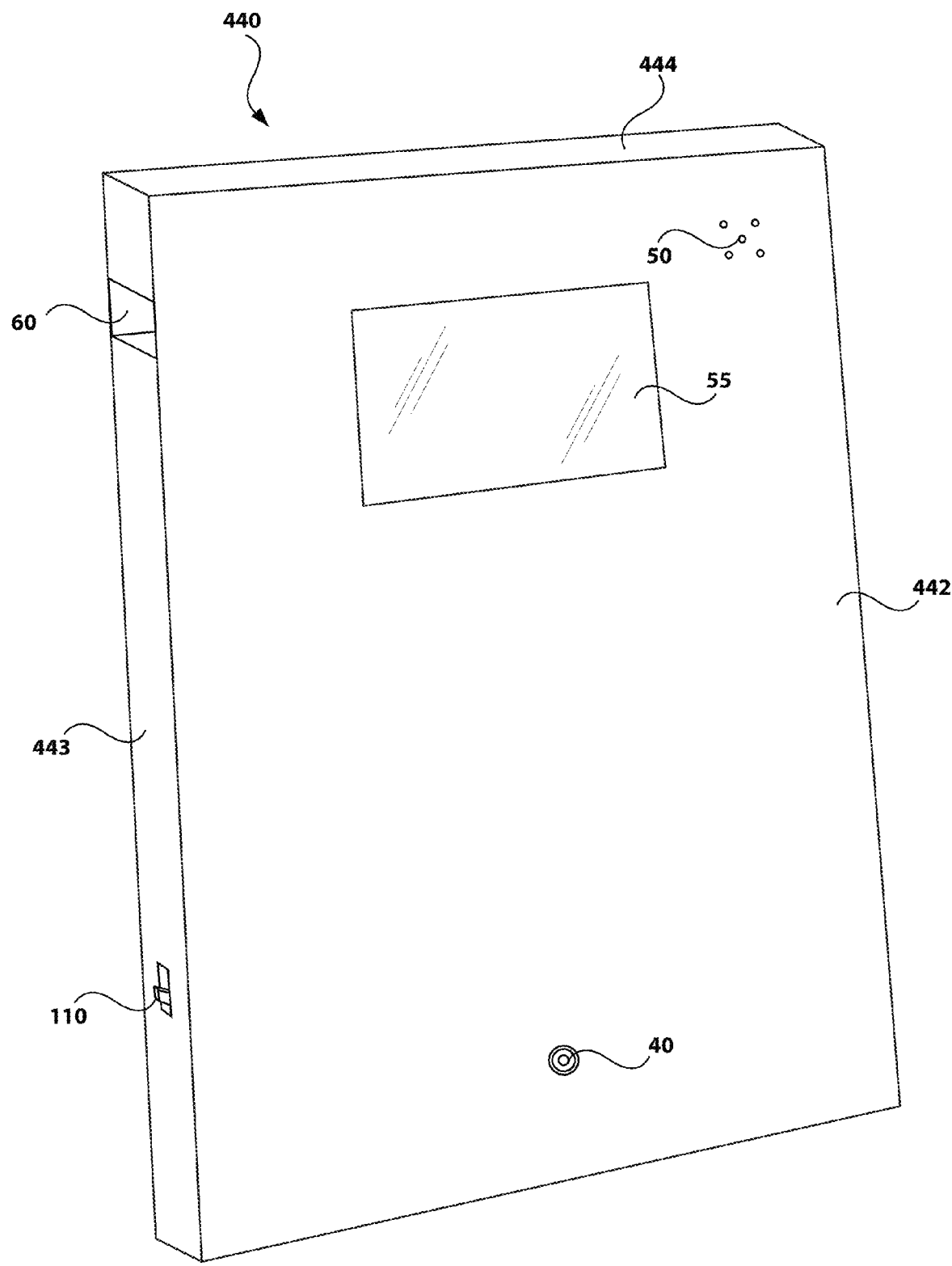
FIG. 8 illustrates an external view of a particular configuration.

FIG. 8 illustrates an embodiment of a flat card construction of the present invention, in which the card 440 has a front 442, a back (not shown) and an edge between the two, shown in FIG. 8 as a top edge 444 and a side edge 443. The front 442 has die cuts for the microphone 40, an audio output device 50 which in this embodiment is a speaker, and a video screen 55. The video screen 55 is visible through the die cut. The switch 110 is located in the side edge 443 and in this embodiment is a manually-operated toggle switch. A die cut for the combined data/power port 60 is located in the side edge 443. In alternative embodiments, the die cut in the side edge 443 may be located on the top edge 444, the opposite side edge (not shown) and/or bottom edge (not shown). A marketing message may be placed on any of the front panels 442 and back panel.

Figure 9:
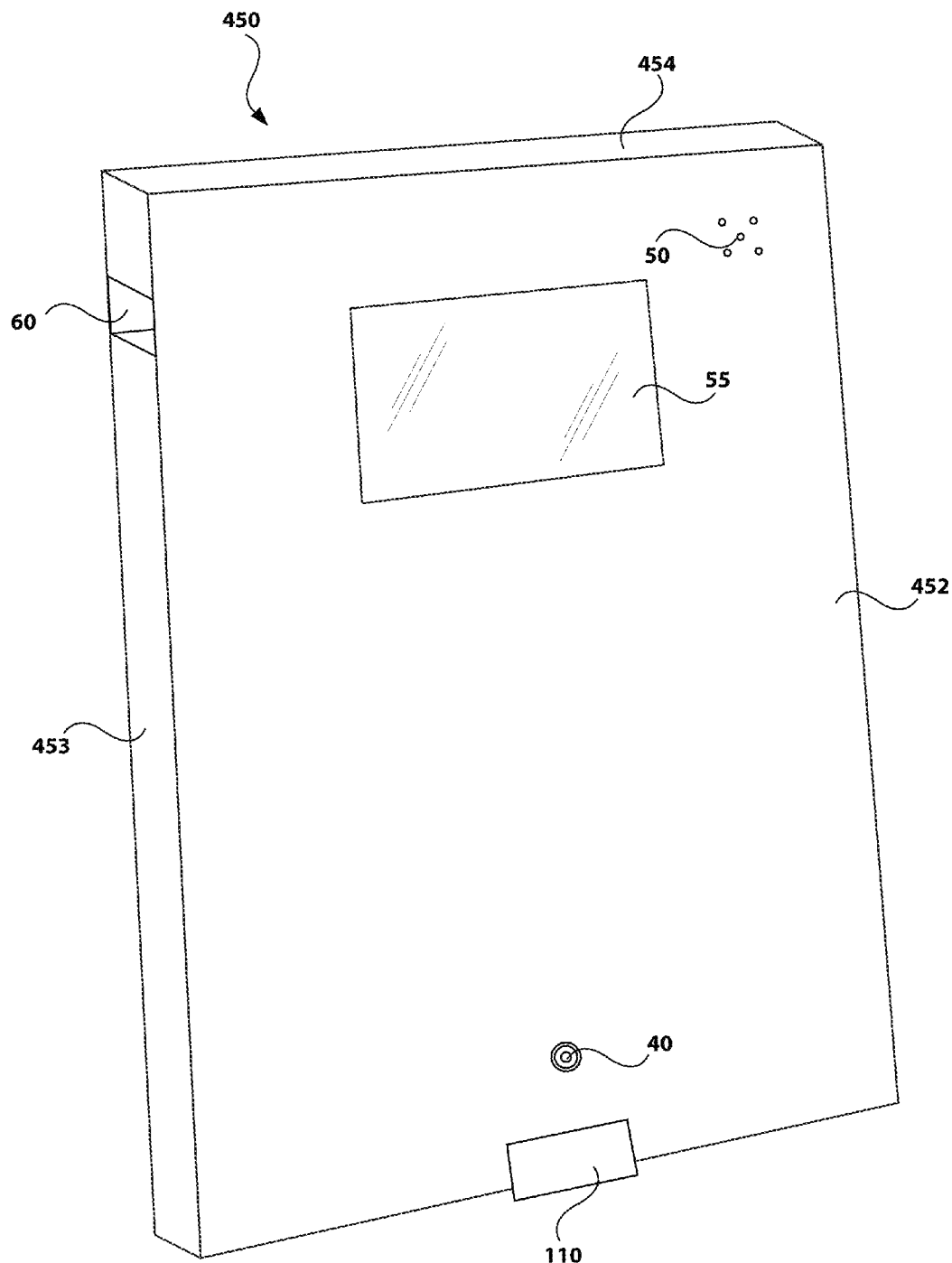
FIG. 9 illustrates an external view of a particular configuration.
Figure 10:
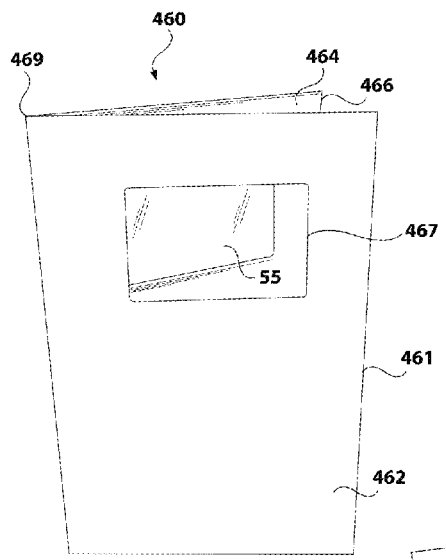
FIGS. 10A, 10B and 10C illustrate external views of a particular configuration.
Figure 10:
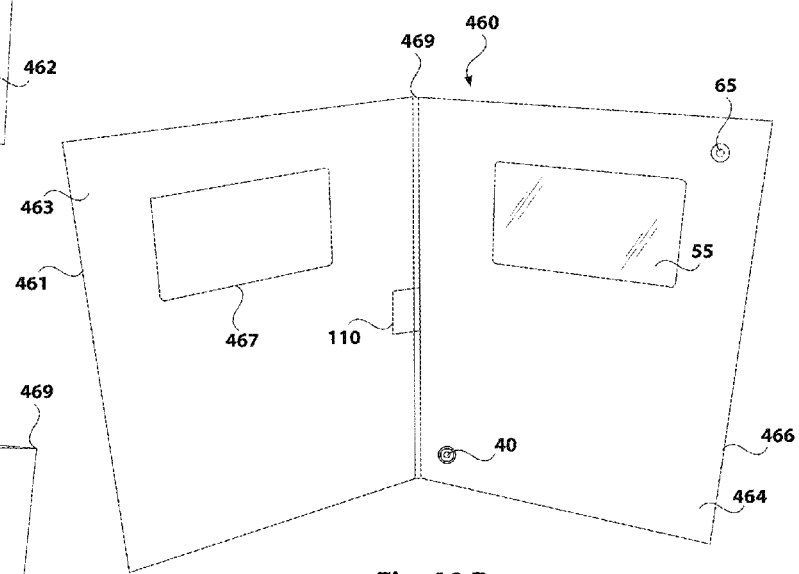
Figure 10:
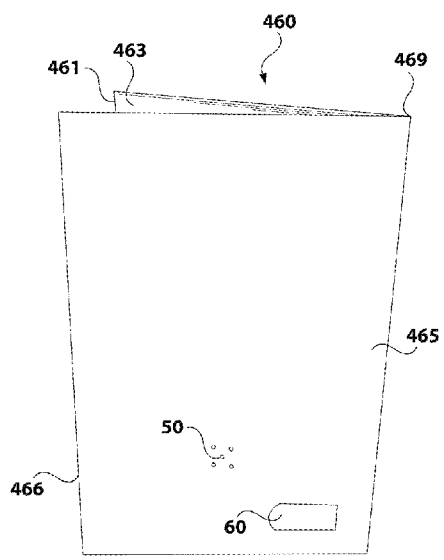
Figure 11:
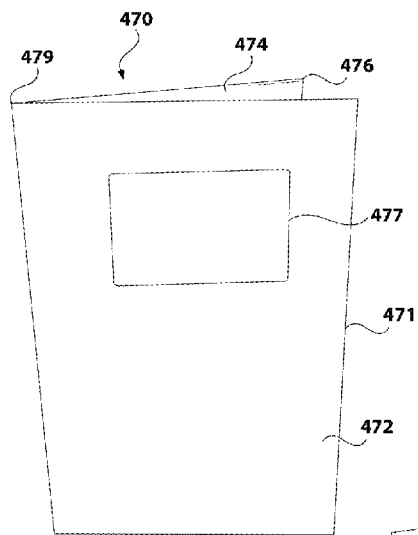
FIGS. 11A, 11B and 11C illustrate external views of a particular configuration.
Figure 11:
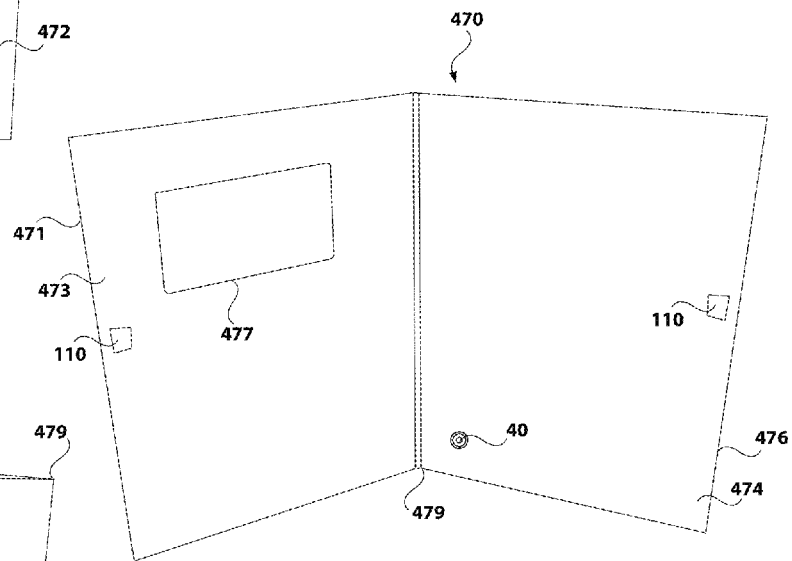
Figure 11:
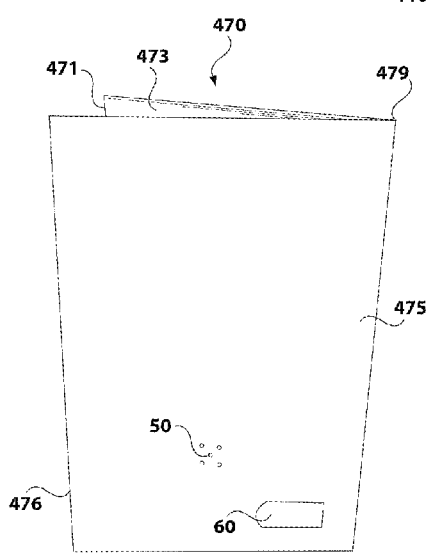
Figure 12:
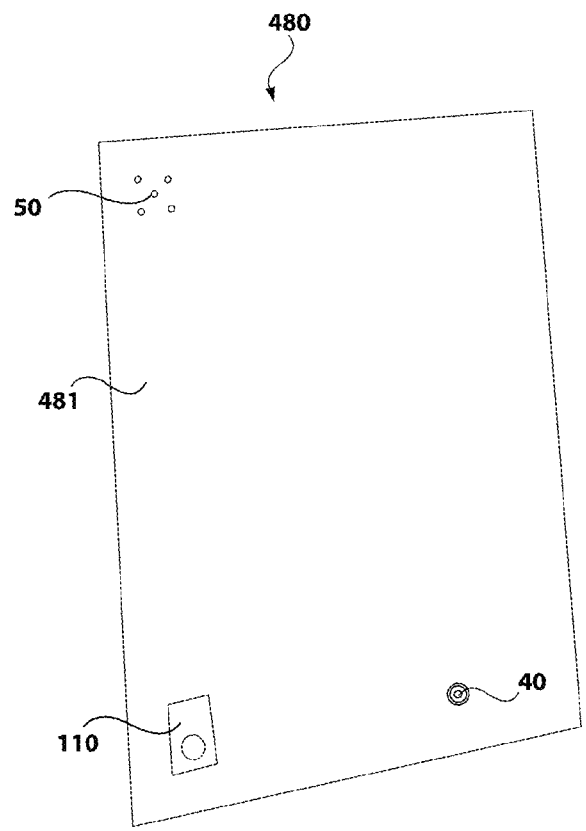
FIGS. 12A and 12B illustrate external views of a particular configuration.
Figure 12:
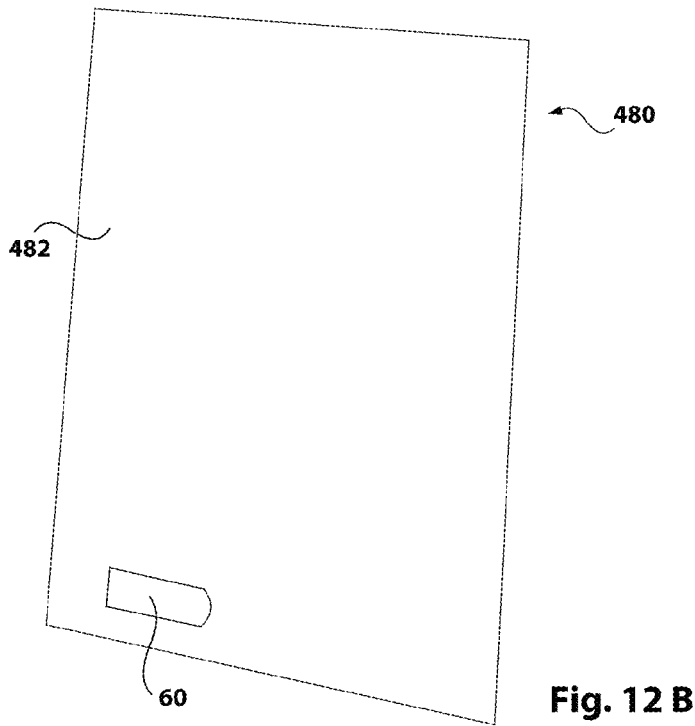
Figure 13:
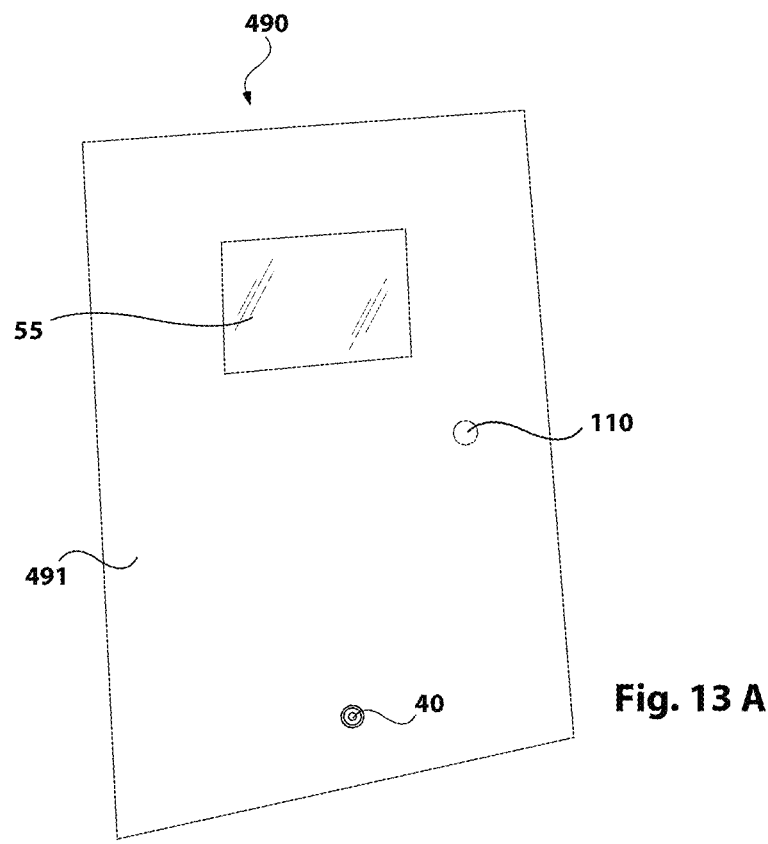
FIGS. 13A and 13B illustrate external views of a particular configuration.
Figure 13:
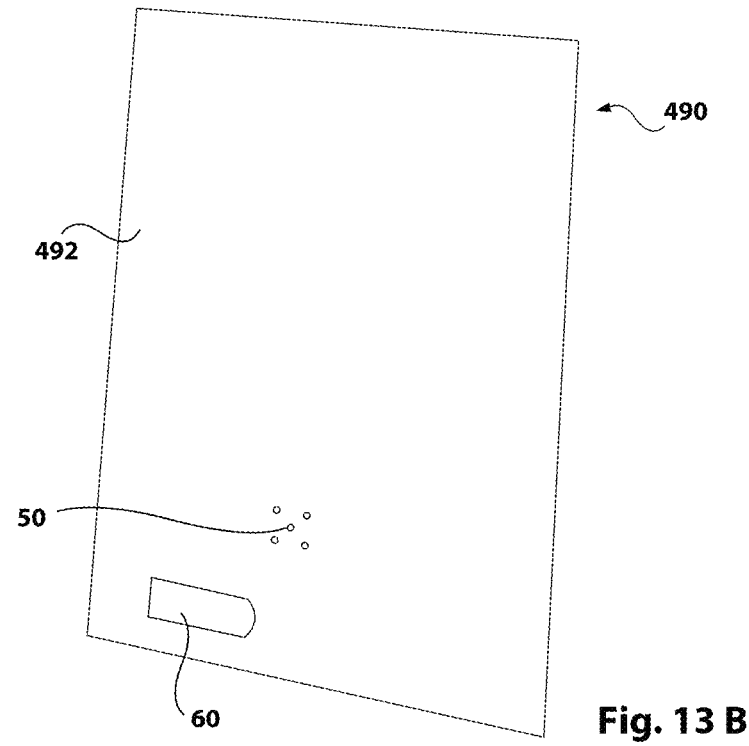
Figure 14:
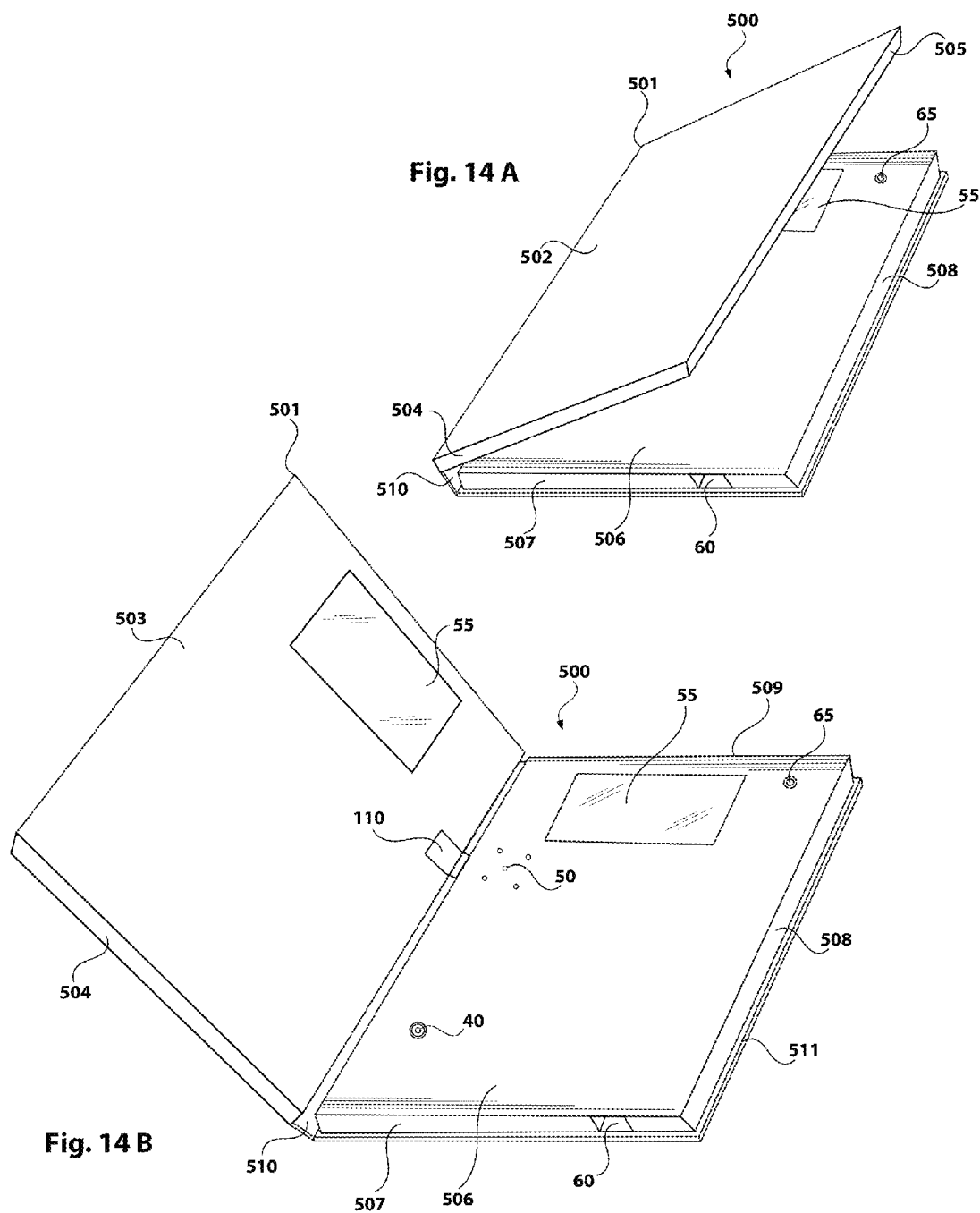
FIGS. 14A and 14B illustrate external views of a particular configuration.

FIG. 9 illustrates an embodiment of a flat card construction of the present invention, in which the card 450 has a front 452, a back (not shown) and an edge between the two, shown in FIG. 8 as a top edge 454 and a side edge 453. The front 452 has die cuts for the microphone 40, an audio output device 50 which in this embodiment is a speaker, and a video screen 55. The video screen 55 is visible through the die cut. The switch 110 is centered close to the bottom of the front 452 and in this embodiment is a manually-operated pull-tab switch. A die cut for the combined data/power port 60 is located in the side edge 453. In alternative embodiments, the die cut in the side edge 453 may be located on the top edge 454, the opposite side edge (not shown) and/or bottom edge (not shown). A marketing message may be placed on any of the front panels 452 and back panel.

FIGS. 10A, 10B and 10C illustrate three perspectives of an embodiment of a moveable card construction of the present invention, in which card 460 has a first panel 461 and a second panel 466 joined along a fold line or hinge 469. The first panel 461 has an outside face 462 and an inside face 463. The second panel 466 has an inside face 464 and an outside face 465. The electronic module 100 is embedded inside the second panel 466. Die cuts in the inside face 464 of the second panel 466 are shown for the microphone 40, the camera 65 and a video screen 55, which is visible through the die cut. A die cut 467 is shown through the first panel 461, which is located so that the video screen 55 is visible through the die cut 467 when the present invention is in a closed position. Die cuts in the outside face 465 of the second panel 466 are shown for the audio output device 50, which in this embodiment is a speaker, and for access to the combined power/data port 60. The switch 110, which in this embodiment is a slide switch, is placed across the hinge 469. The electronic module 100 is activated by the switch 110. In this embodiment, the slide tongue switch 110 activates the electronic module 100 upon the opening of the card, and deactivates the electronic module 100 by the closing of the card. A marketing message may be placed on any of the four panels 462, 463, 464 and 465.

FIGS. 11A, 11B and 11C illustrate three perspectives of an embodiment of a moveable card construction of the present invention, in which card 470 has a first panel 471 and a second panel 476 joined along a fold line or hinge 479. The first panel 471 has an outside face 472 and an inside face 473. The second panel 476 has an inside face 474 and an outside face 475. The electronic module 100 is embedded inside the second panel 476. A die cut in the inside face 474 of the second panel 476 is shown for the microphone 40. A die cut 477 is shown through the first panel 471, which is located so that a particular marketing message placed on the inside face 474 is visible through the die cut when the present invention is in a closed position. Die cuts in the outside face 475 of the second panel 476 are shown for the audio output device 50, which in this embodiment is a speaker, and for access to the combined power/data port 60. The switch 110, which in this embodiment is a magnetic switch, is inside the panel 476 along its outside edge and inside the panel 471 placed along its outside edge so that when the card is in its closed position the two components are in sufficient proximity to form a closed switch. The electronic module 100 is activated by the switch 110. In this embodiment, the magnetic switch 110 activates the electronic module 100 upon the opening of the card, and deactivates the electronic module 100 by the closing of the card. A marketing message may be placed on any of the four panels 472, 473, 474 and 475.

FIGS. 12A and 12B illustrate two perspectives of a flat card construction of the present invention, in which the card 480 has a front 481 and a back 482. The front 481 and back 482 are sealed edge-to-edge. The front 481 has die cuts for the microphone 40, and an audio output device 50 which in this embodiment is a speaker. The switch 110 is located near the lower left-hand corner of the front 481 and in this embodiment is a manually-operated thumb switch. A die cut for the combined data/power port 60 is located on the back 482. A marketing message may be placed on any of the panels 481 and 482.

FIGS. 13A and 13B illustrate two perspectives of a flat card construction of the present invention, in which the card 490 has a front 491 and a back 492. The front 491 and back 492 are sealed edge-to-edge. The front 491 has die cuts for the microphone 40 and a video screen 55 which is visible through the die cut. The switch 110 is located centrally along the right-hand edge of the front 491 and in this embodiment is a push-button switch. Die cuts for the combined data/power port 60 and an audio output device 50 which in this embodiment is a speaker are located on the back 492. A marketing message may be placed on any of the panels 491 and 492.

FIGS. 14A and 14B illustrate two perspectives of an embodiment of a moveable brochure-style construction of the present invention, in which brochure 500 has a first panel 501 and a second panel 509 joined along a hinge 510. The first panel 501 has an outside face 502 and an inside face 503. The two faces of panel 501 are separated by a bottom edge 504, a side edge 505 and a top edge (not shown). The second panel 511 has an inside face 506 and an outside face 511. The two faces of panel 509 are separated by a bottom edge 507, a side edge 508 and a top edge (not shown). The electronic module 100 is embedded inside the second panel 509. Die cuts in the inside face 506 of the second panel 511 are shown for the microphone 40, the audio output device 50, which in this embodiment is a speaker, a video screen 55, which is visible through the die cut, and a camera 65. A die cut in the inside face 503 of the first panel 501 is shown for a second video screen 55, which is visible through the die cut. A die cut in the bottom edge 507 of the second panel 509 is shown for access to the combined power/data port 60. The switch 110, which in this embodiment is a slide switch, is placed across the hinge 510. The electronic module 100 is activated by the switch 110. In this embodiment, the slide tongue switch 110 activates the electronic module 100 upon the opening of the brochure, and deactivates the electronic module 100 by the closing of the brochure. A marketing message may be placed on any of the four panels 502, 503, 506 and 511.

FIGS. 15A, 15B and 15C illustrate three perspectives of a desktop push-button embodiment 520 of the present invention. A push-button 521 is embedded in a circular base 522 that has a bottom 523. The push-button 521 is spring-loaded above the base on springs 524 and 525. The microphone 40 is embedded in the push-button 521. Holes of the audio output device 50, which in this embodiment is a speaker, and the combined power/data port 60 are placed in the side of the base 522. A storage compartment for the power source 30, which in this embodiment is a rechargeable battery, is embedded in the bottom 523. As shown in the cut-away drawing, FIG. 15C, the switch 110 is a lever switch connecting the push-button 521 to the base 522. As further shown in FIG. 15C, the components of the electronic module 100 are located within the base 522. The board 5, with the micro-controller 10, memory 15 and modem 20 sits on the bottom 523, with the antenna 25 mounted to a sidewall of the base 522. The electronic module 100 is activated by the switch 110, which is moved by pressing down on the push-button 521. In this embodiment, the module 100 is activated by depressing the push-button 521 a first time, and de-activated by depressing the push-button 521 a second time. A marketing message may be placed on the push-button 521 and around the exterior surface of the base 522.

FIGS. 16A, 16B, 16C and 16D illustrate four perspectives of a tri-fold card 530. Card 530 consists of a left panel 531, a center panel 532 and a right panel 533. Left panel 531 and center panel 532 are joined along the fold line or hinge 534. Center panel 532 and right panel 533 are joined along the fold line 535. The left panel 531 has an outside face 536 and an inside face 537. Center panel 532 has an inside face 538 and an outside face 539. The inside face 538 and outside face 539 of the central panel 532 are separated by a top edge (not shown) and a bottom edge 540. Right panel 533 has an inside face 541 and an outside face 542. The electronic module 100 is embedded in the central panel 532. Die cuts in the inside face 538 of the central panel 532 are shown for the microphone 40, the audio output device 50, which in this embodiment is a speaker, and the video screen 55, which is visible through the die cut. A die cut in the outside face 539 of the center panel 532 is shown for access to the combined power/data port 60. The switch 110, which in this embodiment is a slide switch, is placed across hinge 535. The electronic module 100 is activated by the switch 110. In this embodiment, the slide tongue switch 110 activates the module 100 upon the opening of the right panel, and deactivates the module 100 by the closing of the right panel. A marketing message may be placed on any of the six faces 536, 537, 538, 539, 541 and 542.

We claim:

1. An apparatus comprising:
   a merchandising product;
   an electronic module, the electronic module comprising a micro-controller, a memory storing at least one digital identification number and at least one chapter of multimedia, a modem, an antenna, a power source, a microphone, and an audio output device; and
   a switch;
   wherein triggering the switch activates the electronic module; and
   wherein upon activation the electronic module plays the multimedia on the audio output device and establishes a cellular connection with a wireless network and
   wherein upon finishing playing the multimedia and completing the connection with the wireless network, the electronic module makes a cellular communication to the digital identification number stored in the memory.

2. The apparatus of claim 1, wherein a marketing message is placed on at least one external surface of the merchandising product.

3. The apparatus of claim 1, wherein the merchandising product comprises at least a first, moveable, panel and a second panel and wherein the switch is operatively connected to the first panel and the second panel such that the movement of the first panel with respect to the second panel triggers the switch.

4. The apparatus of claim 1, wherein the electronic module further comprises at least one video screen.

5. The apparatus of claim 4, wherein the electronic module further comprises a camera.

6. The apparatus of claim 4, wherein at least one video screen is a touch screen.

7. The apparatus of claim 1, wherein the electronic module further comprises a port connected to the power source, and wherein the power source is a rechargeable battery.

8. The apparatus of claim 1, wherein the electronic module further comprises at least one LED.

9. The apparatus of claim 1, wherein the audio output device is a speaker and audio amplifier.

10. The apparatus of claim 1, wherein the audio output device is an earphone jack.

11. The apparatus of claim 1, wherein the electronic module collects and sends the analytics during the cellular communication.

12. The apparatus of claim 1, wherein the electronic module further comprises a GPS module.

13. The apparatus of claim 1, wherein the cellular communication is a cellular telephone call.

14. A method of using a merchandising product for making a cellular communication, comprising the steps of:
   (a) receiving an apparatus comprising a merchandising product, a switch and an electronic module, the electronic module comprising a micro-controller, a memory storing at least one digital identification number and at least one chapter of multimedia, a modem, an antenna, a power source, a microphone, and an audio output device, wherein triggering the switch activates the electronic module; and wherein upon activation the electronic module plays the multimedia on the audio output device and establishes a cellular connection with a wireless network and wherein upon finishing playing the multimedia and completing the connection with the wireless network, the electronic module makes a cellular communication to the digital identification number stored in the memory;

(b) triggering the switch; and (c) once the electronic module has played the multimedia and made the connection with the wireless network, engaging in a cellular communication with the counterparty thereto.

15. The method of claim 14, wherein a marketing message is placed on at least one external surface of the merchandising product.

16. The method of claim 14, wherein the merchandising product further comprises at least a first, moveable, panel and a second panel and wherein the switch is operatively connected to the first panel and the second panel such that the movement of the first panel with respect to the second panel activates the switch, and wherein the step of triggering the switch is performed by moving the first panel with respect to the second panel.

17. The method of claim 14, wherein the electronic module further comprises a video screen and wherein the method further comprises the step of viewing the counterparty to the cellular communication.

18. The method of claim 14, wherein the electronic module further comprises a camera and wherein the method further comprises the step of sending the video from the camera to the counterparty to the cellular communication.

19. The method of claim 14, wherein the electronic module further comprises a port connected to the power source, and wherein the power source is a rechargeable battery.

20. The method of claim 14, wherein the method further comprises the step of the electronic module collecting analytics and sending analytics during the cellular communication.

* * * * *